US009680906B2

(12) United States Patent
Orzell et al.

(10) Patent No.: US 9,680,906 B2
(45) **Date of Patent: *Jun. 13, 2017**

(54) UPSTREAM FAULT DETECTION

(71) Applicant: NETFLIX, INC., Los Gatos, CA (US)

(72) Inventors: Gregory S. Orzell, San Francisco, CA (US); John Funge, Sunnyvale, CA (US); David Chen, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,174

(22) Filed: Dec. 29, 2014

(65) Prior Publication Data

US 2015/0113103 A1 Apr. 23, 2015
US 2017/0034239 A9 Feb. 2, 2017

Related U.S. Application Data

(63) Continuation of application No. 13/451,402, filed on Apr. 19, 2012, now Pat. No. 8,935,581.

(51) Int. Cl.
*G06F 11/00* (2006.01)
*H04L 29/06* (2006.01)

(52) U.S. Cl.
CPC .............. *H04L 65/80* (2013.01); *H04L 67/42* (2013.01)

(58) Field of Classification Search
CPC ......... H04N 21/44209; H04N 21/4348; H04N 21/4425; H04N 21/4532; H04N 19/0023; H04N 19/0043
See application file for complete search history.

(56) References Cited

U.S. PATENT DOCUMENTS

| | | | |
|---|---|---|---|
| 6,807,156 | B1 | 10/2004 | Veres et al. |
| 8,214,855 | B2 | 7/2012 | Pickens et al. |
| 8,232,962 | B2 | 7/2012 | Buck |
| 8,374,590 | B1 | 2/2013 | Mikan et al. |
| 8,547,330 | B2 | 10/2013 | Buck |
| 8,566,856 | B2 | 10/2013 | Amsterdam et al. |
| 2005/0076111 | A1 | 4/2005 | Cherkasova et al. |
| 2006/0005099 | A1 | 1/2006 | Strasman et al. |
| 2006/0037038 | A1 | 2/2006 | Buck |
| 2008/0046910 | A1 | 2/2008 | Schultz et al. |
| 2009/0150715 | A1 | 6/2009 | Pickens et al. |
| 2009/0228910 | A1 | 9/2009 | Christinat et al. |
| 2011/0131596 | A1 | 6/2011 | Amsterdam et al. |
| 2013/0198767 | A1 | 8/2013 | Wang et al. |

OTHER PUBLICATIONS

Extended European Search Report issued on Jul. 3, 2014, in corresponding European Application No. 13164346.2, 7 pages.

*Primary Examiner* — Christopher McCarthy
(74) *Attorney, Agent, or Firm* — Artegis Law Group, LLP

(57) ABSTRACT

Techniques are described for detecting faults in media content based on the behavior of users viewing the media content. Embodiments stream a first instance of media content to one or more users. The behavior of the one or more users is monitored while the users are viewing the streaming first instance of media content. Embodiments then determine whether the first instance of media content is faulty, based on the monitored behavior of the one or more users.

21 Claims, 6 Drawing Sheets

300
VIDEO STREAM
AUDIO STREAM
SUBTITLE STREAM
310
312
314
320
322
324
330

UPSTREAM FAULT DETECTION

CROSS-REFERENCE TO RELATED APPLICATIONS

This application is a continuation of co-pending U.S. patent application Ser. No. 13/451,402, filed Apr. 19, 2012. The subject matter of this related application is hereby incorporated herein by reference.

BACKGROUND OF THE INVENTION

Field of Invention

Embodiments of the present invention relate generally to digital media and, more specifically, to detecting faults in streaming media.

Description of Related Art

Digital content distribution systems conventionally include a content server, a content player, and a communications network connecting the content server to the content player. The content server is configured to store digital content files, which can be downloaded from the content server to the content player. Each digital content file corresponds to a specific portion of an identifying title, such as "Gone with the Wind," which is familiar to a user. The digital content file typically includes sequential content data, organized according to playback chronology, and may comprise audio data, video data, or a combination thereof.

The content player is configured to download and play a digital content file, in response to a user request selecting the title for playback. The process of playing the digital content file includes decoding and rendering audio and video data into an audio signal and a video signal, which may drive a display system having a speaker subsystem and a video subsystem. Playback typically involves a technique known in the art as "streaming," whereby the content server sequentially transmits the digital content file to the content player and the content player plays the digital content file while content data is received that comprises the digital content file.

Many content servers maintain a substantial number of digital content files and frequently add new digital content files to their collection. As the number of content files grows, it often becomes infeasible for quality assurance personnel to individually test each and every content file hosted by the content server. Additionally, the task of verifying each content file becomes more difficult in environments where users may use a wide variety of different clients and equipment to stream content files. In such an environment, particular digital content files may only experience problems on select client applications and/or types of equipment. Moreover, many content servers will maintain multiple encodings for a single title for use in accommodating various clients. For instance, the title "Gone with the Wind" could be encoded in a higher resolution for use with high bandwidth client devices and could be separately encoded in a lower resolution for use with lower bandwidth client devices. As such, it often is impractical for quality assurance personnel to attempt to manually verify each of the different encodings for each content file on each and every combination of client application and client equipment.

SUMMARY OF THE INVENTION

Embodiments described herein provide a method for detecting faults in media content. The method includes streaming an instance of media content to one or more users. Additionally, the method includes monitoring the behavior of the one or more users while the instance of media content is streaming. The method also includes determining whether the instance of media content is faulty, based on the monitored behavior of the one or more users.

Another embodiment described herein provides a method for detecting faults in media content. The method includes monitoring the behavior of one or more users while the one or more users are streaming instances of media content to collect a reference set of data. Additionally, the method includes streaming an instance of media content to a first user. The method also includes monitoring the behavior of the first user while the instance of media content is streaming to collect real-time data. Furthermore, the method includes constructing a first classifier for a sliding temporal window of the reference set of data using a first supervised learning procedure. The method additionally includes constructing a second classifier for a sliding temporal window of the real-time data using the first supervised learning procedure. The method further includes determining whether the instance of media content is faulty using the first classifier and the second classifier.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
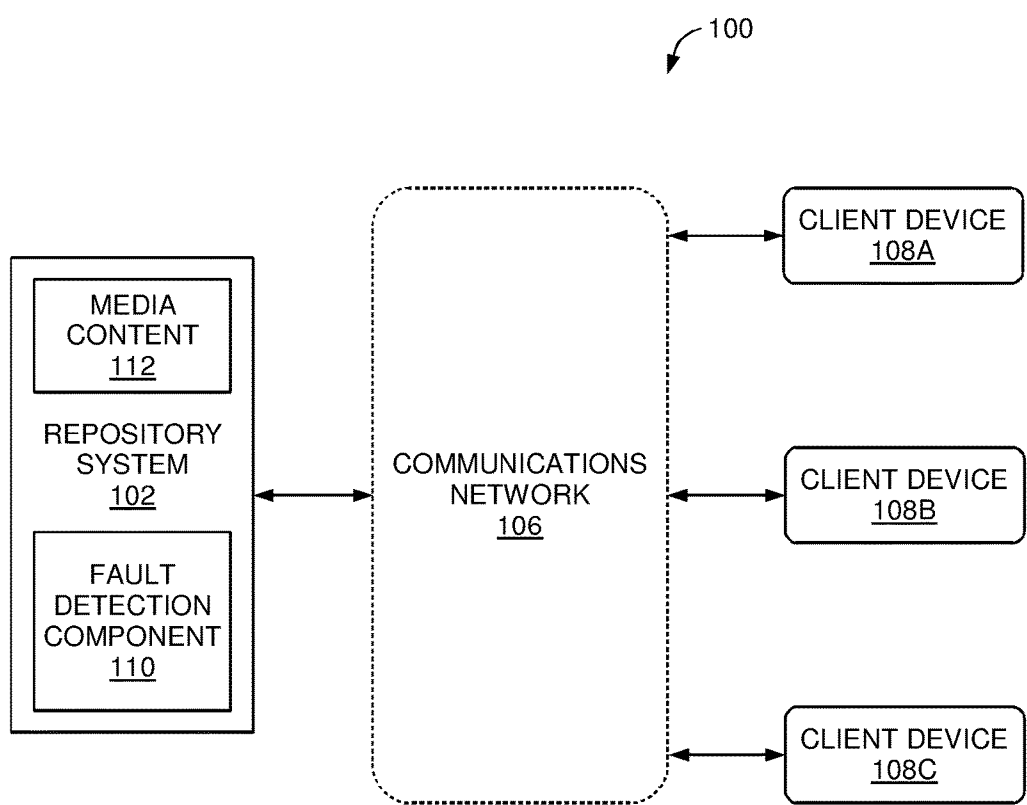
FIG. 1 illustrates a computing infrastructure configured to run a fault detection component, according to one embodiment of the invention.

As the number of content items hosted by content servers grows, it generally becomes increasingly difficult to verify that each content item is working properly. For instance, in a content server hosting a plurality of video content, a first instance of video content could fail to playback due to problems that occurred during the encoding of the video content. As another example, a second instance of video content could experience problems in its audio, such that the video portion of the second instance of video content will play but without any accompanying audio. As yet another example, a third instance of video content could have properly functioning audio and video, but the closed captioning stream for the third instance of video content could be out of sync with the audio and video streams. In all of these examples, the instances of video content could be said to be faulty. However, the content server provider may be unaware of such faults in the instances of media content until a particular number of users have reported the instances as being faulty. Additionally, for this to occur, at least the particular number of users must have attempted to watch the faulty instances of video content and experienced problems in doing so. However, content server providers may wish to detect these faulty instances of video content before a substantial number of users have experienced problems watching the video content, so as to correct the problems with the video content and to minimize the exposure of the faulty video content to the users, thereby improving the users' experience when accessing the content server.

As such, embodiments of the present invention provide techniques for detecting faulty content items based on the browsing behavior of one or more users. Embodiments may stream a first instance of media content to the one or more users. For example, the content server could provide an interface through which the users could select an instance of media content to view. Upon receiving the selection of a particular content item from a user, the content server could begin streaming the selected content item to the user. Embodiments could monitor the behavior of the one or more users during the streaming of the first instance of media content and could determine whether the first instance of media content is faulty based on the monitored behavior of the one or more users. Advantageously, doing so enables the content server to detect faulty instances of media content more quickly and oftentimes before a substantial number of users have experienced problems attempting to view the faulty content. This, in turn, may improve the experience of the users on the content server.

An example of this will now be discussed with regard to FIG. 1, which illustrates a computing infrastructure configured to run a fault detection component, according to one embodiment of the invention. As shown, the computing infrastructure 100 includes a repository system 102 and a plurality of client devices 108A, 108B, and 108C, each connected to a communications network 106. Illustratively, each of the client devices 108A, 108B, and 108C communicates with the repository system 102 over the network 106 to download variations of a software system. Of course, other approaches may be used to allow the client devices 108A, 108B, and 108C to receive a software system dynamically from the repository system 102.

In this example, client devices 108A, 108B, and 108C are configured as consumer devices, such as a consumer electronic device. For instance, the client device 108A could represent a player component capable of executing an Adobe Flash® file, Microsoft® Silverlight® package, a BrightScript application, or an HTML5 object. For example, and without limitation, the client device 108A could be a personal computer system, the client device 108B could be a tablet computing device, and the client device 108C could be an electronic gaming console (e.g., a Microsoft Xbox 360®, a Sony PlayStation® 3, etc.). More generally, however, the client devices 108A-C represent any device capable of receiving streaming content and outputting such content for playback.

In the depicted embodiment, the repository system 102 includes media content 112 and a fault detection component 110. Of course, in other embodiments, the media content 112 and fault detection component 110 can reside together or separately across two or more computer systems. Generally, the media content 112 represents any digital media content that can be streamed to a client device 108A-C. Examples of such media content 112 include, without limitation, video content, audio content, image content and computer gaming content. As described in greater detail below, the fault detection component 110 is generally configured to identify faulty instances of the media content 112 by monitoring the behavior of users that are viewing the instances of the media content 112. For instance, the fault detection component 110 could monitor the browsing behavior of a plurality of users while the users are viewing a first instance of the media content 112. The fault detection component 110 could then analyze the monitored browsing behavior of the users to determine whether the first instance of the media content 112 is faulty. As used herein, a fault in an instance of media content broadly refers to any problem or abnormality in the instance of media content. Examples of such faults include, without limitation, problems with the video stream (e.g., a black screen is displayed rather than the actual video, grainy or blurry video quality, etc.), problems with the audio stream (e.g., no audio, audio that is out of sync with the video stream, etc.), problems with the closed captioning (e.g., captions in the wrong language, incorrect captions, out-of-sync captions, etc.).

For purposes of the present example, assume that the first instance of media content is a video with a runtime of 120 minutes. If, in this example, the fault detection component 110 determines that a substantial number of the monitored users cease playback of the video within the first 60 seconds, the fault detection component 110 could determine that a fault exists in the video file. Additionally, the fault detection component 110 could be configured to identify a portion of the content item in which the fault occurs. For instance, in this example, the fault detection component 110 could determine that because a substantial number of users ceased playback within the first minute of the video, the fault exists within the first sixty seconds of the video. As another example, the fault detection component 110 could determine that a substantial number of users disable the closed captioning between 30 and 35 minutes into the video. As such, the fault detection component 110 could determine that a fault exists in the closed captioning stream associated with the video and that the fault exists around the portion of the video occurring between 30 and 35 minutes in.

Upon determining that a fault exists in an instance of the media content, the fault detection component 110 could perform a remedial action for the content item. For example, in one embodiment, the fault detection component 110 is configured to generate a notification indicating that a faulty instance of media content has been detected. Such a notification could then be transmitted, for instance, to quality assurance personnel for the content server, so as to bring the faulty instance of media content to the quality assurance personnel's attention.

In another embodiment, the fault detection component 110 could be configured to perform an automated corrective procedure for the faulty instance of media content. For example, upon detecting a faulty instance of media content, the fault detection component 110 could automatically re-encode the instance of media content. That is, since the faults in many faulty content items can be attributed to problems that occurred when the content items were encoded, the fault detection component 110 can be configured to automatically re-encode a content item upon detecting the content item is faulty. The fault detection component 110 could then replace the faulty instance of media content with the re-encoded instance on the content server. Advantageously, doing so can help to detect and correct faulty instances of media content quickly and before these faulty instances of content negatively impact the browsing experience of other users of the content server.

Figure 2:
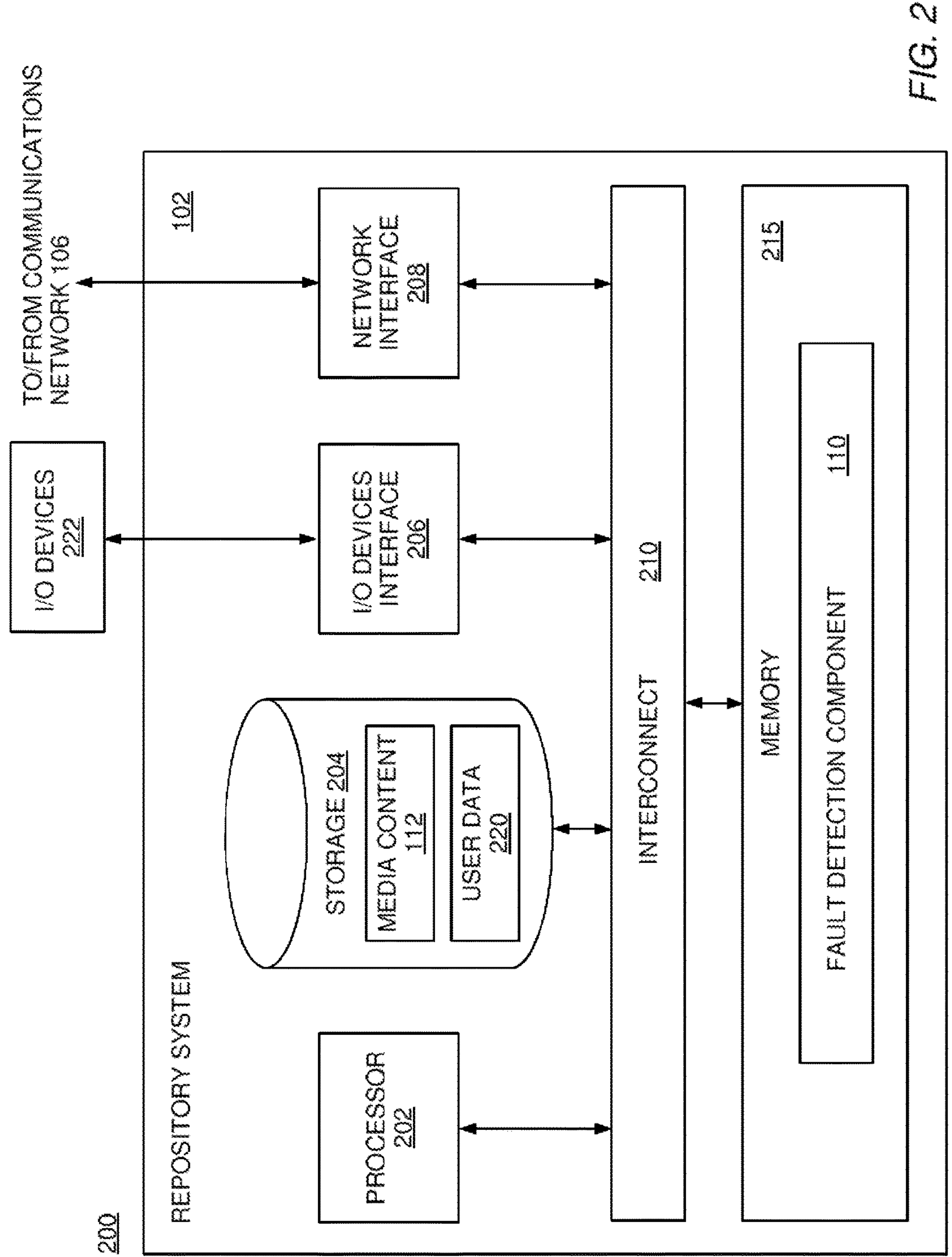
FIG. 2 is a more detailed view of the repository system of FIG. 1, according to one embodiment of the invention.

FIG. 2 is a more detailed view of the repository system 102 of FIG. 1, according to one embodiment of the invention. As shown, the repository system 102 includes, without limitation, a central processing unit (CPU) 202, a network interface 215, an interconnect 210, and a system memory 212. The CPU 202 retrieves and executes programming instructions stored in the system memory 212. Similarly, the CPU 202 stores and retrieves application data residing in the system memory 212. The interconnect 210 facilitates transmission, such as of programming instructions and application data, between the CPU 202, input/output (I/O) devices interface 222, storage 204, network interface 208, and system memory 212. The I/O devices interface 222 is configured to receive input data from user I/O devices. Examples of user I/O devices may include one of more buttons, a keyboard, and a mouse or other pointing device. The I/O device interface 222 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

CPU 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). The network interface 208 is configured to transmit data via the communications network 106, e.g., to transmit context tokens and localized digital assets 226 from the client devices 108A, 108B, and 108C, as well as to return a assembled variation of digital content generated by the dynamic context-based assembler 220 to the client devices 108A, 108B, and 108C.

The system memory 212 stores a fault detection component 110 that is configured to identify faulty instances of the media content 112 based on the monitored browsing behavior of one or more users. For instance, the fault detection component 110 could determine that a substantial number of users fast forward through or otherwise skip past the first 2 minutes of a particular content item. Such a scenario could occur, for example, when there are problems with the first 2 minutes of the video stream of the particular content item (e.g., the video stream is blurry), causing users to skip ahead to the properly-working sections of the content item. Upon detecting this behavior from the users, the fault detection component 110 could determine that the content item is faulty and take remedial action for the faulty content item. For instance, the fault detection component 110 could be configured to generate a notification indicating that the particular content item is faulty. As another example, the fault detection component 110 could be configured to re-encode the faulty content item using source content. As yet another example, the fault detection component 110 could be configured to determine that the faulty content item was generated using faulty source content and could generate a notification identifying the faulty source content.

In one embodiment, the fault detection component 110 is configured to detect behavioral patterns amongst users having one or more characteristics in common with respect to a given content item. Such characteristics could include, without limitation, a resolution at which the users are streaming the content item, a common type of device the users are using to stream the content item, attributes of the streaming content item (e.g., whether closed captioning was enabled), a geographic location of the users, a time of day the users are streaming the content item, and so on. For instance, the fault detection component 110 could determine that a substantial number of users within the group of users who watched a first content item using closed captioning stopped watching the content item within the first minute. Based on this, the fault detection component 110 could determine that a fault exists within the closed captioning stream for the first content item and could perform remedial actions accordingly.

As another example, the fault detection component 110 could determine that a substantial number of users who are viewing a second content item using mobile devices stopped watching the second content item after 5 minutes or began skipping ahead to later portions of the content item after 5 minutes. Based on this determination, the fault detection component 110 could determine that the second content item is faulty. In one embodiment, the fault detection component 110 could further determine that the fault exists within the first 5 minutes of the second content item. Based on this determination, the fault detection component 110 could generate a notification to quality assurance personnel for the content server identifying the second content item and indicating that a fault is believed to exist within the first 5 minutes of the content item. Advantageously, doing so brings the faulty instance of media content to the quality assurance personnel's attention and identifies the portion of the media content believed to contain the fault, thereby allowing the quality assurance personnel to more quickly verify and correct the fault.

In one embodiment, fault detection component 110 is configured detect faulty instances of media content based on real-time contrasts between reference data collected from users viewing content on the content server and real-time data collected from users viewing a specific instance of media content. The fault detection component 110 may build a classifier using a reference set of data and a particular range of time. A specific timeframe for which there are no anomalies (i.e., during which users of the content server were viewing instances of media content that did not contain any faults) is manually selected. Such a window could be selected, for instance, by examining the time-weighted bitrate delivered during streaming of the media content, re-buffering rate during the streaming of the content, startup delay, and various other streaming quality of experience metrics. In one embodiment, the fault detection component 110 is configured to update the reference set of data over time in order to account for seasonal or global trends. That is, because the viewing behavior of users may change over time or seasonally (e.g., there may be an increase in younger viewers with different behavioral patterns during the summer months), the fault detection component 110 may be configured to update the reference data in order to account for these variances in user behavior.

Additionally, a window of static size is designated to represent the temporal window of interest. The fault detection component 110 may use the designated window to perform a sliding window real-time analysis of data collected from monitoring the behavior of users streaming media content on the content server. That is, the fault detection component 110 could be configured to, when a new time point is reached, remove the earliest time point in the window and to add the new time point to the window. Additionally, the fault detection component 110 can be configured to perform a supervised learning procedure to build the classifier between the reference data set and the data set in the most current window. Examples of such learning procedures include random forest, support vector machine ("SVM"), etc.

The fault detection component 110 could then use the model to predict the class assignment for a particular instance of media content (i.e., faulty or not faulty). Generally, if the window of data collected from monitoring users viewing a first instance of media content differs greatly from the window of data from the reference set, the fault detection component 110 can more accurately identify faulty instances of media content. That is, as the distributions of signals between the reference set of data (e.g., the data collected from monitoring users viewing media content across the content server) and the new data time windows (e.g., the data collected from users viewing the first instance of media content) differ more and more, the fault detection component 110 can more accurately distinguish between these data sets. This increase in accuracy leads to a decreased error rate in identifying the faulty instances of content.

Thus, for example, if the fault detection component 110 compares the window of data collected from monitoring users viewing the first instance of media content with the reference data set and determines that these data sets differ greatly, the fault detection component 110 could conclude that the instance of media content is faulty due to the variation between the data sets. The fault detection component 110 could also consider the divergence between the data sets in determining the first instance of media content is faulty. That is, the fault detection component 110 could conclude that an increased measure of divergence between the data sets indicates that the first instance of media content is faulty. On the other hand, if the fault detection component 110 compares the two data sets and determines that there is little variation (or divergence) between the data sets, the fault detection component 110 could conclude that the instance of media content is functioning properly and thus is not faulty.

Additionally, in one embodiment, the fault detection component 110 may be configured to provide graphical representations of the data window for both the reference data and the real-time data collected from users streaming the media content. These graphical representations could then be displayed (e.g., to quality assurance personnel) and analyzed in order to detect faulty instances of media content. For instance, a user could view the graphical representations and determine whether the real-time data represents a statistical anomaly, thereby indicating that the corresponding instance of media content is faulty.

Figure 3:
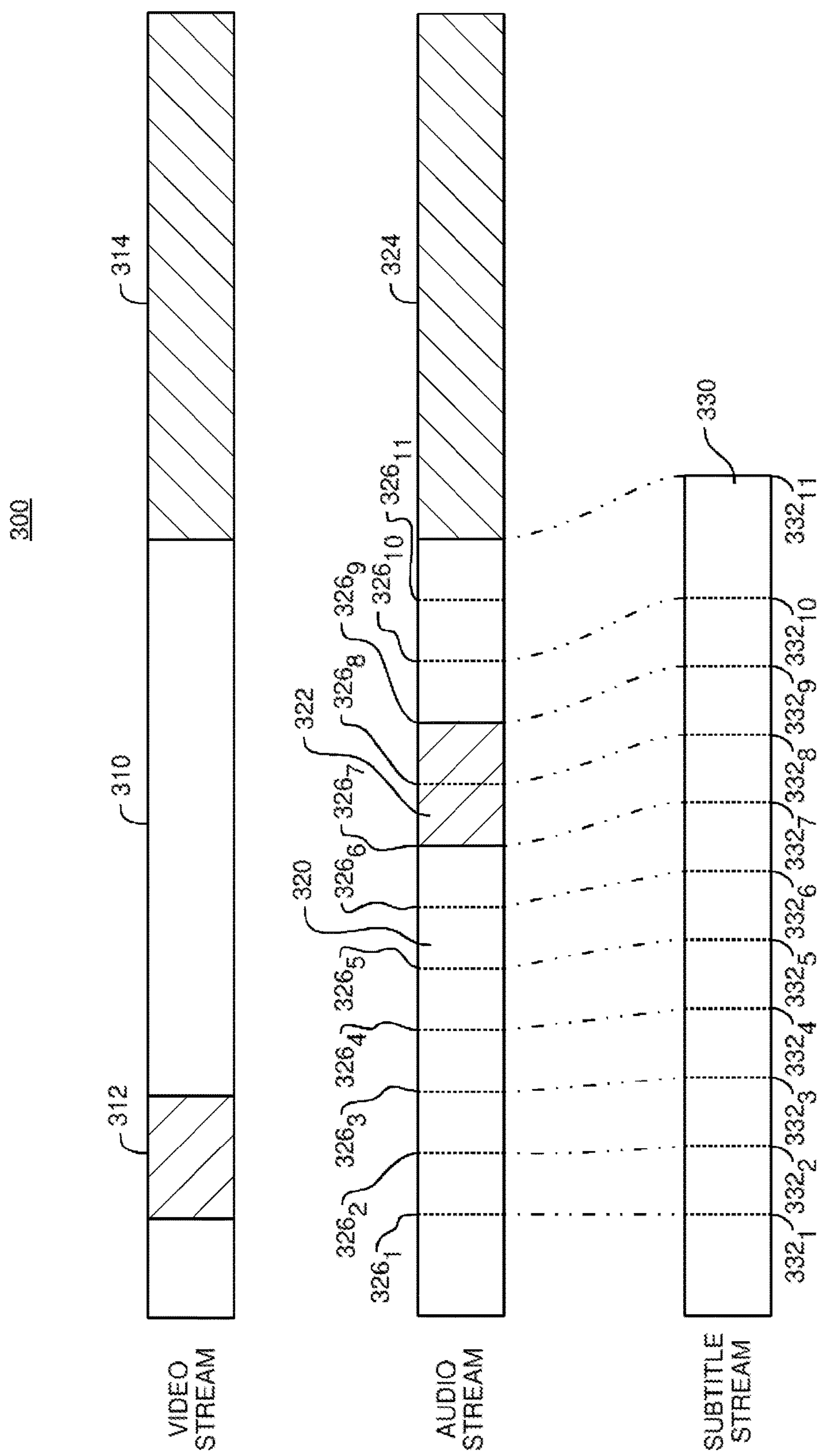
FIG. 3 is a diagram illustrating multiple streams of a content item, according to one embodiment of the invention.

FIG. 3 is a diagram illustrating multiple streams of a content item, according to one embodiment of the invention. As shown, the diagram 300 includes a video stream 310, an audio stream 320 and a subtitle stream 330. The video stream 310 includes a first faulty portion 312 and a second faulty portion 314. For instance, the first portion 312 could be a segment of the video stream 310 that appears distorted when viewed, and the second portion 314 could be a segment of the video stream 310 where only a black screen is displayed.

As discussed above, the fault detection component 110 could be configured to monitor the behavior of users watching the content item in order to detect faults in the content item. For example, the fault detection component 110 could determine that a substantial number of users stop viewing the content item or fast forward to a later section of the content item when the users reach the portion 312 in the video stream 310. Based on this, the fault detection component 110 could determine that the content item is faulty and could further determine that the portion 312 of the video stream 310 is faulty, based on the users fast forwarding past this portion. Likewise, if the fault detection component 110 determines that a substantial number of users cease viewing the content item once the portion 314 is reached, the fault detection component 110 could determine that the portion 314 is a faulty portion of the video stream 310. The fault detection component 110 could then perform a corrective action for the content item (e.g., generating a notification to quality assurance personnel identifying the portions 312 and 314 of the video stream 310).

In the depicted example, the audio stream 320 also contains a first faulty portion 322 and a second faulty portion 324. Here, the first portion 322 represents a section of the audio stream 320 where the audio is distorted. The fault detection component 110 could be configured to monitor the behavior of users streaming the content item and could detect that the content item contains the first faulty portion 322 based on a substantial number of users fast-forwarding past the first portion 322. In one embodiment, the fault detection component 110 is configured to detect when users mute the audio playback of the audio stream 320. If the fault detection component 110 then detects that a substantial number of users mute the audio playback once the first portion 322 of the audio stream 320 is played, the fault detection component 110 could determine that a fault exists within the first portion 322.

Additionally, the second faulty portion 324 represents a portion of the audio stream 320 where no audio is played and corresponds to the portion 314 of the video screen where only a black screen is displayed when the content item is viewed. The fault detection component 110 could be configured to identify the second faulty portion 324 based on determining a substantial number of users ceased playback of the content item once playback of the portion 324 began. Upon detecting a fault exists within the content item, the fault detection component 110 could then perform a corrective action for the faulty content item. For instance, the fault detection component 110 could be configured to disable subsequent streaming of the content item and to generate a notification to quality assurance personnel for the content server identifying the content item and the detected fault.

The diagram 300 additionally depicts a subtitle stream 330, which includes a plurality of segments 332, each of which corresponds to a respective segment 326 of the audio stream 320 (i.e., the text in the segment 332 of the subtitle stream 330 matches the audio in the corresponding segment 326 of the audio stream 320). As shown, the subtitle segment $\mathbf{332}_1$ corresponds to the audio segment $\mathbf{326}_1$, the subtitle segment $\mathbf{332}_2$ corresponds to the audio segment $\mathbf{326}_2$, and so on.

However, in the depicted diagram 300, the content item contains a fault in the subtitle stream 330, in that the audio stream 320 and the subtitle stream 330 gradually become out of sync as the playback of the content item continues. That is, while the earlier subtitle segments (e.g., subtitle segment $\mathbf{332}_1$) are in sync with the corresponding audio segments (e.g., audio segment $\mathbf{326}_1$), the subtitles in the later segments of the subtitle stream 330 (e.g., subtitle segment $\mathbf{332}_{11}$) are substantially delayed with respect to the corresponding segments of the audio stream 320 (e.g., audio segment $\mathbf{326}_{11}$). As a result, the subtitle stream 330 gradually becomes increasingly inaccurate as the playback of the content item continues, and eventually reaches a point where the subtitles are of little use whatsoever to the viewers of the content item.

As such, the fault detection component 110 could be configured to monitor the behavior of users viewing the content item with respect to their use of the subtitle stream 330. For example, the fault detection component 110 could be configured to monitor when users enable or disable the display of subtitles during the playback of the content item. If the fault detection component 110 then detects that, of the users who originally enabled subtitles for the content item, a substantial number of these users eventually disabled the subtitles as the playback continues, the fault detection component 110 could conclude that a fault exists within the content item. That is, because users may disable the display of subtitles once the subtitle stream 330 becomes out of sync with the audio stream 320, the fault detection component 110 could determine that the detected behavior of users disabling the display of subtitles is indicative of a fault within the subtitle stream 330 for the content item.

Figure 4:
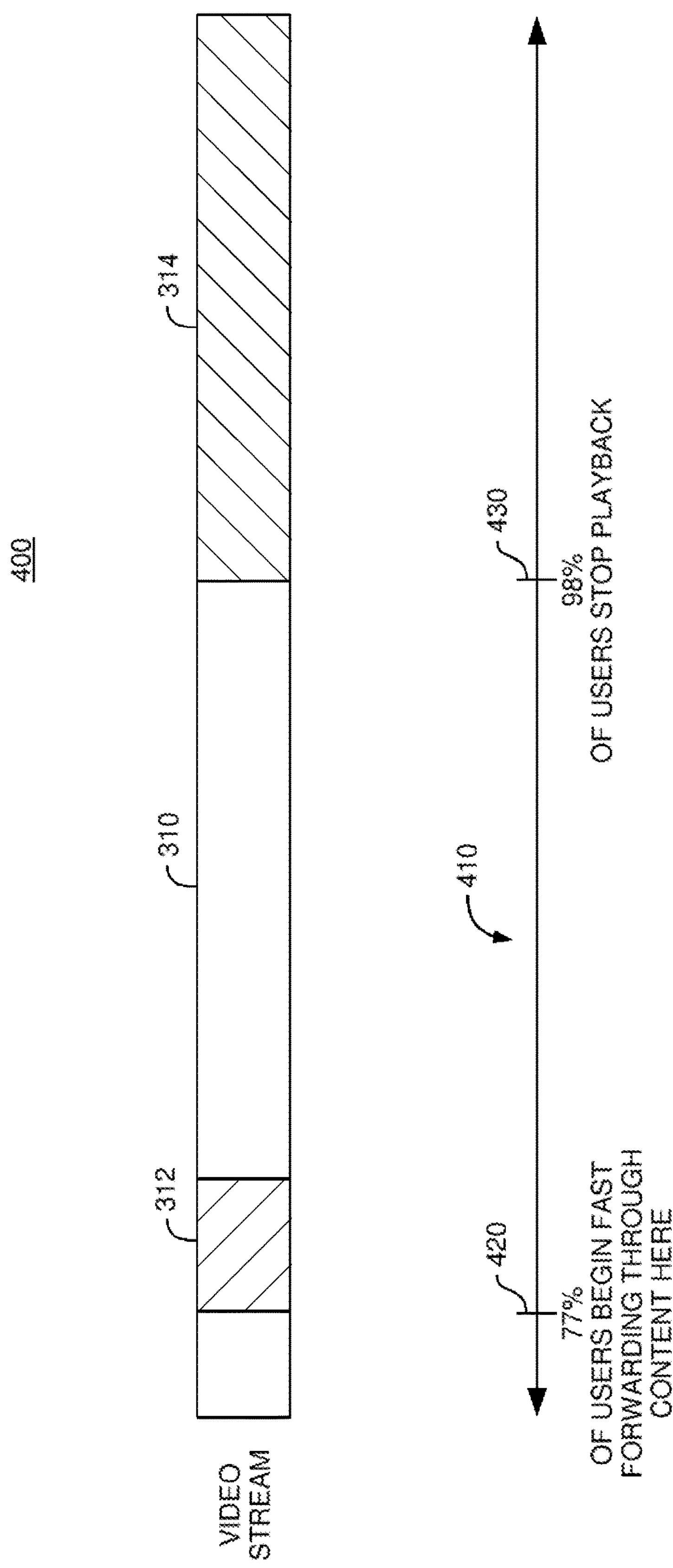
FIG. 4 is a diagram illustrating the actions of users that are viewing a video stream, according to one embodiment of the invention.

FIG. 4 is a diagram illustrating the actions of users that are viewing a video stream, according to one embodiment of the invention. As shown, the diagram 400 includes the video stream 310, having a first faulty portion 312 and a second faulty portion 314. As discussed above, the first faulty portion 312 represents a section of the video stream 310 that appears distorted when displayed, and the second faulty portion 314 represents a section of the video stream 310 that appears as a black screen when displayed. The diagram 400 also contains a timeline 410 that depicts user behavior during the playback of the video stream 310. As such, the fault detection component 110 could monitor the users' behavior while the users are viewing the video stream and could detect that at point 420 77% of the users fast forwarded through a portion of the streaming content. In one embodiment, the fault detection component 110 could be configured to compare the detected percentage of users performing the fast forwarding action with a threshold percentage of users and could determine a fault exists in the video stream if the detected percentage exceeds the threshold percentage. Additionally, upon detecting that 98% of users ceased playback of the streaming video at point 430, the fault detection component 110 could determine that this monitored behavior is indicative of a second fault within the video stream 310 (i.e., faulty portion 314).

As such, the fault detection component 110 could be configured to perform a corrective action for the video stream 310. As an example, the fault detection component 110 could disable subsequent streaming of the content item and could generate a notification to quality assurance personnel for the content server, identifying the content item and the detected faulty portions 312 and 314 within the content item. As another example, the fault detection component 110 could be configured to disable subsequent streaming of the content item and to re-encode the video stream 310 using source content. The fault detection component 110 could then replace the content item with the re-encoded content item and could re-enable streaming of the content item. Advantageously, doing so may automatically resolve any faults within the content item, where the original faulty portions 312 and 314 were caused by problems during the original encoding process.

Figure 5:
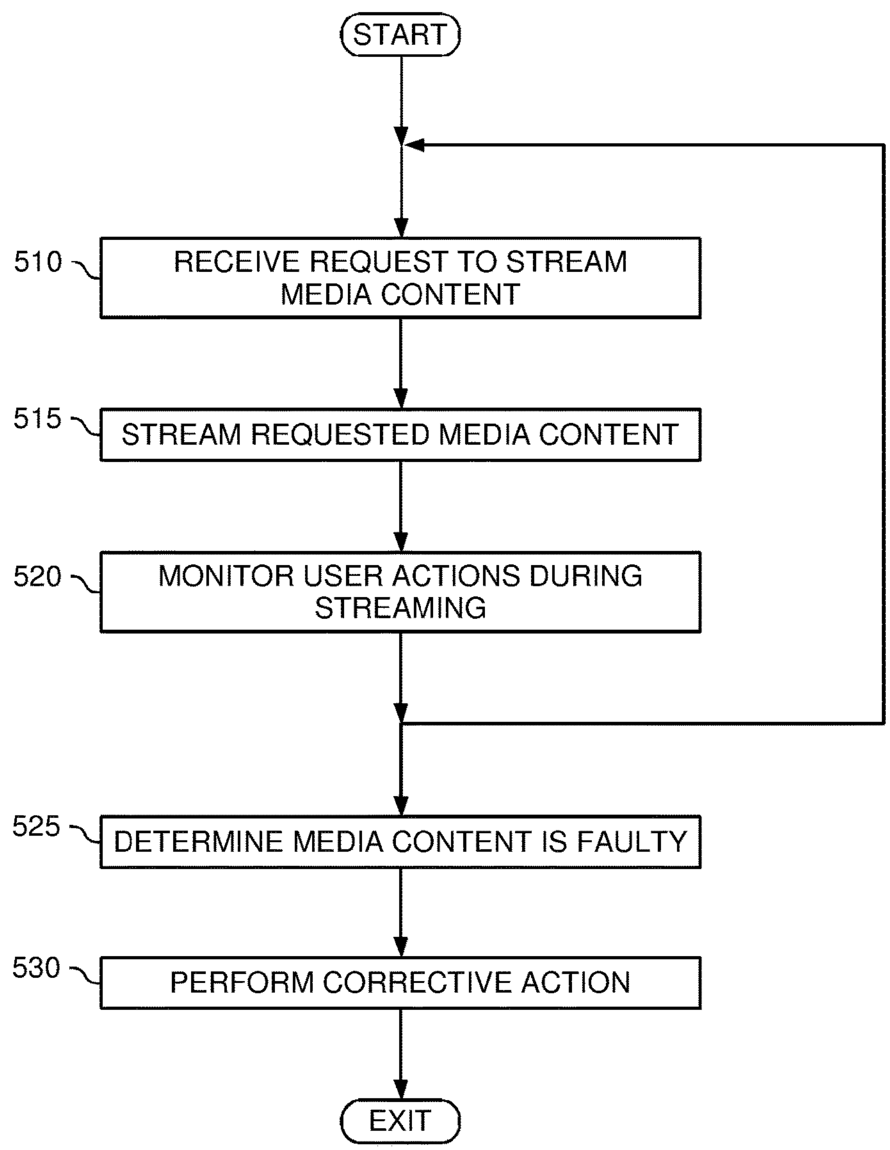
FIG. 5 is a flow diagram illustrating a method for detecting faults in media content, according to one embodiment of the invention.

FIG. 5 is a flow diagram illustrating a method for detecting faults in media content, according to one embodiment of the invention. As shown, the method 500 begins at step 510, where a content server receives a request to stream media content from a user. For example, such a request could be generated in response to a user selecting the media content on an interface of a client device. Upon receiving the request, the content server begins streaming the requested media content to the user (step 515). The fault detection component 110 then begins monitoring the actions of the user while the content is streaming (step 520). For instance, the fault detection component 110 could determine, without limitation, when the user fast forwards through the media content, ceases playback of the media content, enables or disables subtitles for the media content, mutes the audio of the client device displaying the media content, raises or lowers the volume of the client device, and so on. As shown, the method 500 may then return to step 510, where the content server receives a request to stream the media content from a second user. In such a scenario, the fault detection component 110 monitors the behavior of the second user while the content is streaming.

Upon monitoring the actions of one or more users streaming the media content, the fault detection component 110 determines that the media content is faulty based on the monitored actions of the users streaming the content (step 525). For example, assume that a particular portion of the audio stream of the media content is exceptionally quiet due to problems during the encoding process of the media content. In such an example, the fault detection component 110 could detect that a substantial number of users streaming the content turned up the volume of the client devices at a first point during the playback and then turned down the volume of their client devices at a second point during the playback. As such, the fault detection component 110 could determine that a fault exists with the audio stream of the media content between the first point and the second point.

Upon detecting the fault exists, the fault detection component 110 performs a corrective action for the media content (step 530) and the method 500 ends. For example, the fault detection component 110 could be configured to flag the instance of media content as faulty in a database. Quality assurance personnel for the content server could then monitor the database and could investigate instances of media content marked as faulty to confirm that problems exist with the flagged instances of media content and to correct these problems. Advantageously, doing so helps to ensure that faulty instances of media content are identified efficiently and expediently.

Figure 6:
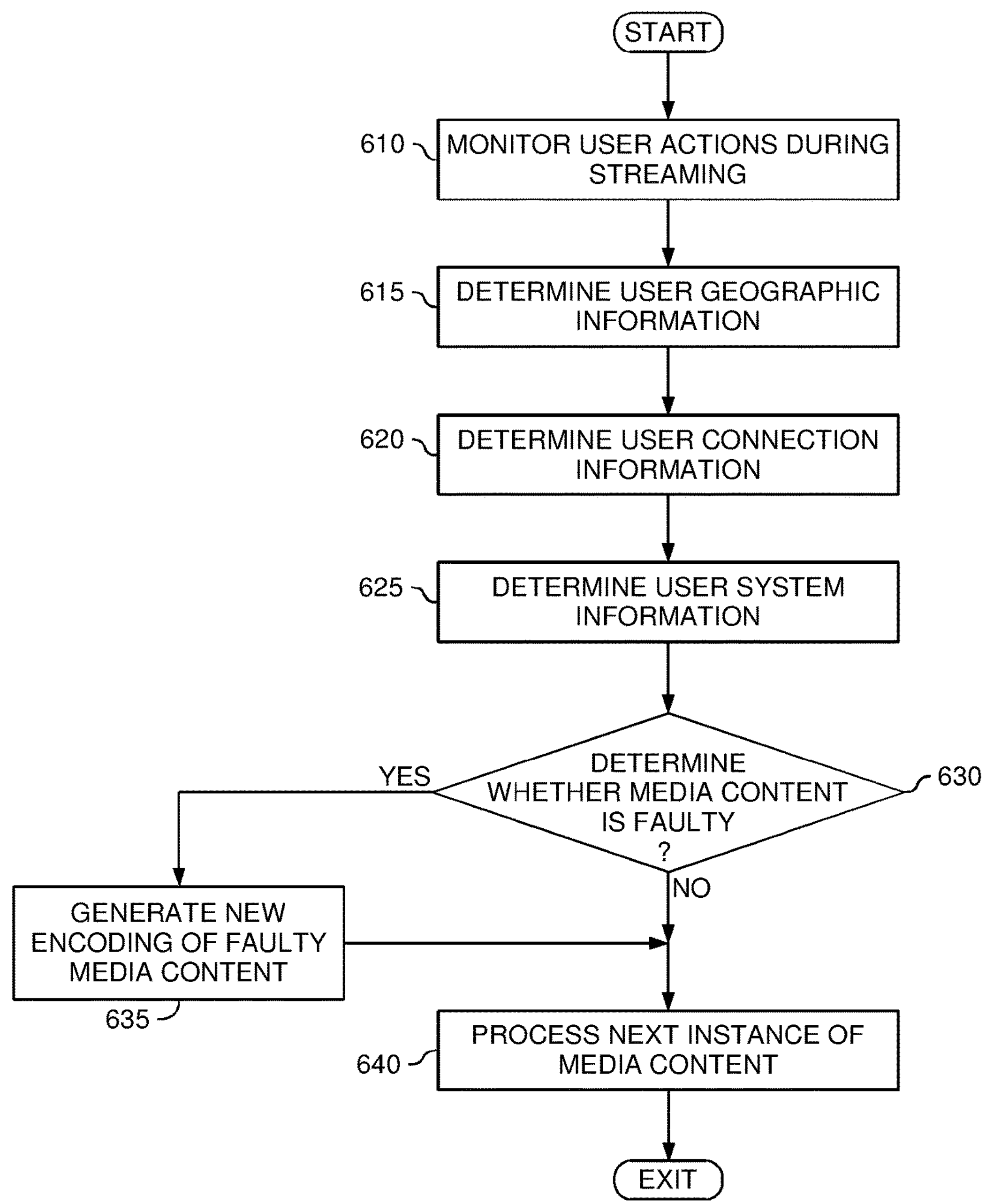
FIG. 6 is a flow diagram illustrating a method for correcting faulty instances of media content, according to one embodiment of the invention.

FIG. 6 is a flow diagram illustrating a method for correcting faulty instances of media content, according to one embodiment of the invention. As shown, the method 600 begins at step 610, where the fault detection component 110 begins monitoring user actions during the streaming of a content item. In the depicted embodiment, the fault detection component 110 also determines geographic location information for the user (step 615). Such geographic location information may then be used in grouping users who are performing similar actions during the streaming of the media content. For example, if the fault detection component 110 determines that a substantial number of users from a specific geographic location are ceasing playback of a content item before the content item has finished, the fault detection component 110 could determine that the content item is not faulty but rather that a network problem may exist for these users.

Additionally, the fault detection component 110 determines network connection information for the users (step 620). For instance, such information could include measurements of latency, loss, bandwidth, and so on for the users' network connection used in streaming the content. In one embodiment, the fault detection component 110 may further determine the method in which the users are connecting to their home networking devices (e.g., wired or wireless connections). Such network connection information may then be used by the fault detection component 110 to distinguish between faulty instances of media content and network-related issues that impair the streaming of the media content.

In the depicted embodiment, the fault detection component 110 further determines system information for the users (step 625). Such system information may include the type of client device the users are using to stream the media content, the specifications of the client device, the workload of the client device, and so on. The fault detection component 110 may then use the system information to identify faulty instances of media content as well as to distinguish between faulty instances of media content and streaming issues caused by problems with the client device. For example, if the fault detection component 110 determines that a substantial number of users using a mobile device to stream the content are ceasing playback of the content after just a few minutes, the fault detection component 110 could determine that the encoding for the content at the resolution used for streaming to mobile devices is faulty. As another example, if the fault detection component 110 determines that a majority of the users ceasing playback of the content early are doing so on client devices operating under a heavy workload, the fault detection component 110 could determine that the media content is not faulty but instead the problems streaming the content are being caused by the high workload of the client devices.

The fault detection component 110 then determines whether the instance of media content is faulty (step 630). As discussed above, such a determination may be made based on the monitored actions of the users, the geographic information of the users, the connection information for the users and/or the system information for the users. If the fault detection component 110 determines the instances of media content is faulty, the fault detection component 110 generates a new encoding of the media content by re-encoding source content (step 635). The fault detection component 110 may then replace the faulty instance of media content with the newly generated instance. In one embodiment, the fault detection component 110 is configured to disable subsequent streaming of the media content upon detecting the media content is faulty, and is further configured to re-enable streaming of the media content once the faulty content is replaced by the newly generated encoding of the media content.

Once the new encoding of the media content is generated or once the fault detection component 110 determines the media content is not faulty, the fault detection component 110 begins processing the next instance of media content (step 640) and the method 600 ends. Advantageously, doing so allows the fault detection component 110 to automatically correct the problems with the faulty instance of media content and to do so in a way that minimizes users' interactions with the faulty instance of media content. Furthermore, the embodiments described herein provide techniques through which faulty instances of media content can be detected automatically, alleviating the need for quality assurance personnel to peruse each and every instance of media content hosted on the content server.

While the foregoing is directed to embodiments of the present invention, other and further embodiments may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:

1. A computer-implemented method, comprising:

monitoring at least one user machine while a first instance of media content is streaming to the at least one user machine; and determining, by operation of at least one processor, whether the first instance of media content includes an encoding fault that produces a playback error based on behavior associated with the at least one user machine matching predefined behavior indicative of the encoding fault.

2. The computer-implemented method of claim 1, wherein determining whether the first instance of media content includes the encoding fault is further based on a geographic location of the at least one user machine, network information associated with the at least one user machine, device information associated with the at least one user machine, browsing behavior associated with the at least one user machine, or a group to which a user associated with the at least one user machine belongs.

3. The computer-implemented method of claim 2, wherein determining whether the first instance of media content includes an encoding fault comprises determining that the first instance of media content does not include the encoding fault when at least two user machines located within a first geographic location have ceased playback of the first instance of media content at substantially a first playback position.

4. The computer-implemented method of claim 1, further comprising automatically performing a corrective action associated with the first instance of media content upon determining that the first instance of media content does include the encoding fault.

5. The computer-implemented method of claim 4, wherein performing a corrective action associated with the first instance of media content comprises at least one of generating a notification specific to the first instance of media content, and flagging within a database the first instance of media content as faulty.

6. The computer-implemented method of claim 4, wherein the first instance of media content comprises a plurality of individual streams, and wherein performing a corrective action associated with the first instance of media content comprises identifying a first stream included in the plurality of individual streams as faulty.

7. The computer-implemented method of claim 4, wherein performing a corrective action associated with the first instance of media content comprises:

encoding source content to generate a second instance of the media content; and replacing the first instance of media content with the second instance of media content.

8. The computer-implemented method of claim 1, wherein performing a corrective action associated with the first instance of media content comprises causing a suspension of streaming the first instance of media content to the at least one user machine.

9. The computer-implemented method of claim 1, wherein determining whether the first instance of media content includes an encoding fault comprises analyzing the behavior associated with the at least one user machine to distinguish between a streaming problem and a potential faulty encoding.

10. The computer-implemented method of claim 1, wherein determining whether the first instance of media content includes an encoding fault comprises determining that the behavior associated with the at least one user machine at substantially a first playback position associated with the first instance of media content matches the predefined behavior indicative of the encoding fault.

11. A system, comprising:

a processor; and a memory including instructions that, when executed by the processor, cause the processor to detect faults in media content by:

monitoring at least one user machine while a first instance of media content is streaming to a plurality of user machines; and determining whether the first instance of media content includes an encoding fault that produces a playback error based on behavior associated with the at least one user machine matching predefined behavior indicative of the encoding fault.

12. A computer-readable storage medium including instructions that, when executed by a processor, cause the processor to detect faults in media content, by performing the steps of:

monitoring a first user machine while a first instance of media content is streaming to the first user machine; and determining whether the first instance of media content includes an encoding fault that produces a playback error based on behavior associated with the first user machine matching predefined behavior indicative of the encoding fault and based on one or more characteristics associated with the first user machine.

13. The computer-readable storage medium of claim 12, wherein the one or more characteristics associated with the first user machine comprises a geographic location of the first user machine, network information associated with the first user machine, or device information associated with the first user machine.

14. The computer-readable storage medium of claim 13, wherein determining whether the first instance of media content includes an encoding fault comprises determining that the first instance of media content does not include the encoding fault when the first user machine and another user machine located within the same geographic location as the first user machine have ceased playback of the first instance of media content at substantially a first playback position.

15. The computer-readable storage medium of claim 12, further comprising automatically performing a corrective action associated with the first instance of media content upon determining that the first instance of media content does include the encoding fault.

16. The computer-readable storage medium of claim 15, wherein performing a corrective action associated with the first instance of media content further comprises at least one of generating a notification specific to the first instance of media content, and flagging within a database the first instance of media content as faulty.

17. The computer-readable storage medium of claim 15, wherein the first instance of media content comprises a plurality of individual streams, and wherein performing a corrective action associated with the first instance of media content comprises identifying a first stream included in the plurality of individual streams as faulty.

18. The computer-readable storage medium of claim 15, wherein performing a corrective action associated with the first instance of media content comprises:

encoding source content to generate a second instance of the media content; and replacing the first instance of media content with the second instance of media content.

19. The computer-readable storage medium of claim 12, wherein performing a corrective action associated with the first instance of media content comprises causing a suspension of streaming the first instance of media content to the first user machine.

20. The computer-readable storage medium of claim 12, wherein determining whether the first instance of media content includes an encoding fault comprises analyzing the behavior associated with the first user machine to distinguish between a streaming problem and a potential faulty encoding.

21. The computer-readable storage medium of claim 12, wherein determining whether the first instance of media content includes an encoding fault comprises determining that the behavior associated with the first user machine at substantially a first playback position associated with the first instance of media content matches the predefined behavior indicative of the encoding fault.

* * * * *